United States Patent [19]
> Phillippi et al.

[11] Patent Number: 4,721,533
[45] Date of Patent: Jan. 26, 1988

[54] PROTECTIVE STRUCTURE FOR AN IMMERSION PYROMETER

[75] Inventors: R. Michael Phillippi, Highland, Md.; David C. Greenspan, Vienna; Ernie Tokay, Reston, both of Va.

[73] Assignee: System Planning Corporation, Arlington, Va.

[21] Appl. No.: 891,847

[22] Filed: Aug. 1, 1986

[51] Int. Cl.$^4$ .............................. H01L 35/02
[52] U.S. Cl. .................. 136/234; 374/179; 374/208; 374/165
[58] Field of Search .............. 374/139, 140, 149; 136/230, 234, 242, 233

[56] References Cited

U.S. PATENT DOCUMENTS

| | | | |
|---|---|---|---|
| 2,655,550 | 10/1958 | Zvanut | 13/24 |
| 3,106,493 | 10/1963 | Japka | 136/234 X |
| 3,250,125 | 5/1966 | Bonn | 374/140 |
| 3,537,911 | 11/1970 | Hynd | 136/234 X |
| 3,580,744 | 5/1971 | Inouye et al. | 136/234 |
| 3,610,045 | 10/1971 | Shearman | 374/139 |
| 3,647,558 | 3/1972 | McMurtry | 136/234 |
| 3,647,559 | 3/1972 | Truppe et al. | 374/179 X |
| 4,102,708 | 7/1978 | Dancy | 136/130 X |
| 4,206,632 | 6/1980 | Suraki | 374/4 X |
| 4,216,028 | 8/1980 | Kurita | 136/234 |
| 4,390,290 | 6/1983 | O'Neill et al. | 374/179 X |
| 4,430,518 | 2/1984 | Nakajima et al. | 374/179 X |
| 4,467,134 | 8/1984 | Pustell | 374/144 X |
| 4,530,884 | 7/1985 | Erickson et al. | 428/621 |

Primary Examiner—Daniel M. Yasich
Attorney, Agent, or Firm—Pollock, Vande Sande & Priddy

[57] ABSTRACT

An immersion pyrometer having an outer casing comprising a mixture of graphite and a refractory metal oxide for contact with molten metal, an inner sheath enclosed by said outer casing, said inner sheath comprising a closed end metal tube wherein the closed end is in heat transfer contact with said outer casing, and a thermocouple within said inner sheath.

20 Claims, 3 Drawing Figures

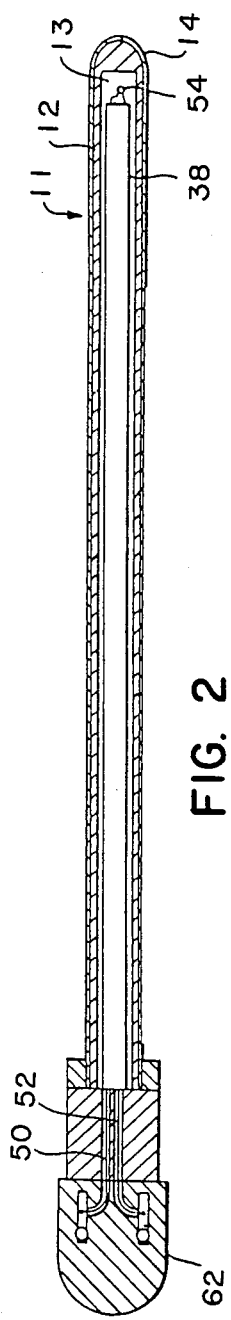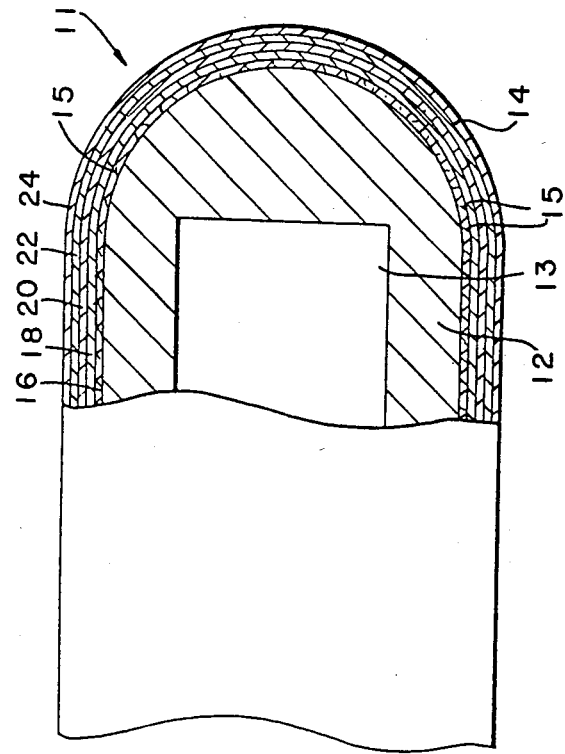

PROTECTIVE STRUCTURE FOR AN IMMERSION PYROMETER

BACKGROUND OF THE INVENTION

This invention relates to immersion pyrometers and more particularly to structures for protecting temperature sensing elements in pyrometers used to measure the temperatures of molten metals.

Many industrial and scientific processes require the measurement and control of extremely high temperatures. For example, measurements of the temperature of molten metals are essential to proper process control in the metal processing industry. Two of the most common instruments used to determine the temperatures of molten metals are the optical pyrometer and the disposable lance thermocouple. However, each of these devices has its disadvantages. The optical pyrometer is not as accurate as is desirable, and can only measure the surface temperature of the molten metal. The disposable lance thermocouple is inaccurate, does not permit continuous measurement of the temperature of the molten metal, and its use involves some safety problems for the person using it.

As a result of the shortcomings of the optical pyrometer and the disposable lance thermocouple, considerable effort has been expended in developing an immersion pyrometer which has a long-term continuous reading capability. In one type of an immersion pyrometer, a thermocouple junction is encased in a tube made of a metal with a high melting temperature which is coated with a ceramic, such as $Al_2O_3$ or a mixture of $Al_2O_3$ and $Cr_2O_3$ which protects the metal tube from the molten metal environment. However, in use the ceramic layer or layers tends to spall and permit molten metal to contact the metal substrate and attack it. The inner metal tube cannot withstand attack by the slag and/or the molten metal and it, together with the sensing element enclosed therein is quickly destroyed. The sensing element, usually a noble metal thermocouple, is expensive and it is desirable to be able to reuse it many times. However, structures which have been designed to protect the thermocouples have resulted in a slow thermal response, making them substantially ineffective for many purposes.

U.S. patent application Ser. No. 775,183 filed Sept. 12, 1985, for IMMERSION PYROMETER describes a protective sheath for a thermocouple which is capable of withstanding severe thermal shock and which exhibits good resistance to corrosion and erosion by molten metals. While this sheath has an service life which is relatively long, it is desirable to increase the service life even further.

SUMMARY OF THE INVENTION

It is accordingly one object of this invention to provide means for protecting a thermocouple for intermittent or continuous use for an extended period of time in a molten metal environment.

It is another object of this invention to provide apparatus for sensing the temperature of molten metals in which separable inner and outer protective casings are provided for the temperature sensing element.

It is still another object of this invention to provide a temperature sensing apparatus which combines a plurality of protective layers with the characteristic of a good thermal response.

It is a further object of this invention to provide a temperature sensing apparatus which rapidly and accurately follows changes in the temperature of molten metal baths.

In accordance with this invention there is provided a temperature sensing apparatus comprising a combination of a sheath for enclosing a temperature-sensing element, said sheath comprising a closed end metal tube; a temperature sensing element disposed in said sheath near the closed end thereof; and a casing having an outer surface for contacting high temperature molten media and an inner cavity for holding said sheath, said cavity having an inner surface, an outer opening, and an inner closed end, said casing comprising a refractory metal oxide and graphite, said graphite being present in a sufficiently high concentration to provide good heat conductivity between said outer surface of said casing and the inner surface of said cavity.

The temperature sensing apparatus disclosed herein combines adequate mechanical durability with good corrosion-errosion resistance in the presence of slag and/or liquid metals and a fast thermal response. For example, a service life in molten metal of over 100 hours can be achieved with the capability of a time of eight minutes to go from room temperature to 2850° F. Furthermore, these properties are achieved at a relatively low cost since, while the sensing element itself may be costly, especially if a noble element thermocouple is used, the outer casing protects the metal tube from corroding in the high temperature environment. As an additional advantage, in the event the outer casing fails, the inner sheath will provide protection to the temperature sensing element located therein for a long period of time.

The outer casing can be installed in a tundish or other vessel for holding molten metal, and the inner sheath which contains the temperature sensing element can be inserted in an removed from the outer casing at the convenience of an operator. If it becomes necessary to replace the thermocouple while molten metal is in the vessel, the thermocouple and inner sheath can be removed safely since these components are not in contact with the melt. At the end of a tundish campaign, for example, the inner sheath may be removed and installed in another tundish.

BRIEF DESCRIPTION OF THE DRAWINGS

FIG. 2 is a sectional view showing details of an inner sheath with a thermocouple disposed therein.

FIG. 3 is a sectional view showing details of the protective cermet and ceramic layers for the inner sheath in a preferred embodiment of this invention.

DETAILED DESCRIPTION OF THE INVENTION

Figure 1:
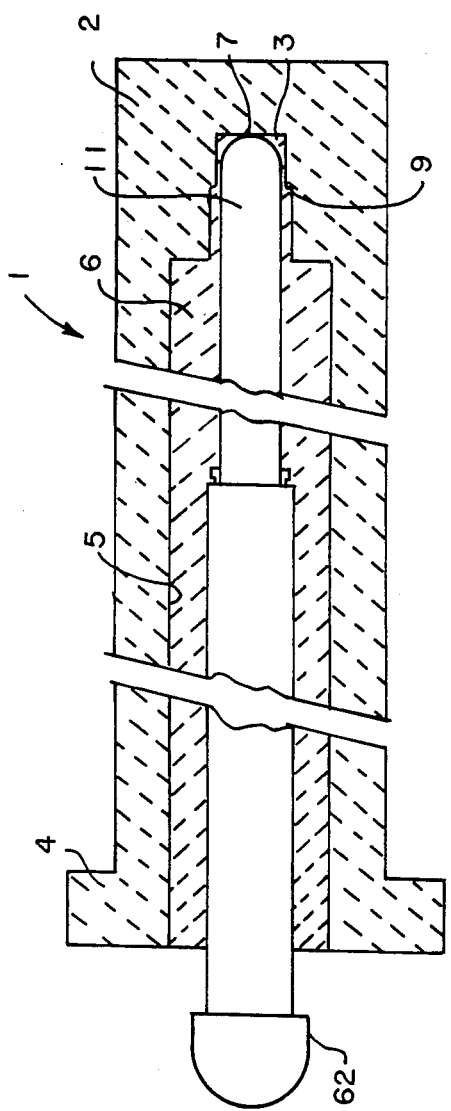
FIG. 1 is a sectional view showing the inner sheath and outer casing with an intermediate layer of a ceramic material.

FIG. 1 is a sectional view of temperature sensing apparatus 1 having inner sheath 11 which contains a temperature sensing element (not shown) centered within outer casing 2 with an intermediate layer of a ceramic 6 cast between inner sheath 11 and outer casing 2. The temperature sensing apparatus 1 is constructed for insertion into a port in the walls or on top of a vessel containing molten metals, and can be mounted in place on a vessel for containing liquid metal by flange 4.

INNER SHEATH

The inner sheath 11 must have high strength at elevated temperatures, and the invention contemplates the use of either a metal tube or a ceramic- or cermet-coated metal tube. Metal tubes which may be used include molybdenum and nickel-chrome steels such as the stainless steels. Molybdenum is the preferred metal for uncoated tubes since it appears to have a restricted reactivity with the material of the outer casing.

While uncoated metal tubes, such as molybdenum or stainless steel tubes may be used, the preferred structure for the inner sheath 11 is a cermet-coated tube and the most preferred structure is described in co-pending application Ser. No. 775,183, filed Sept. 12, 1985 for IMMERSION PYROMETER. As described therein, and as shown in FIGS. 2 and 3, a metal tube 12, which is preferably molybdenum, is coated with a plurality of porous graded layers 14 of a cermet and an outer layer of a ceramic. As will be discussed in more detail below, the graded cermet layers are thin layers containing $Al_2O_3$—$Cr_2O_3$, and molybdenum in a decreasing concentration of molybdenum as the outer ceramic layer is approached.

Closed-end tube 12 defines cavity 13 which contains thermocouple junction 54. Thermocouple wires 50 and 52 interconnect terminal head 62 with thermocouple junction 54 and are held in place in sheath 11 by double-bore insulation, not shown. Terminal head 62 may be provided with seals, not shown.

The metal tube 12 is formed by methods known in the art from a metal or metal alloy which has requisite properties of a high melting point and strength at high temperatures. Molybdenum is the metal of choice for use at extremely high temperatures in view of its excellent mechanical properties at elevated temperatures. The thermal conductivity and specific heat of the metal of the tube control the temperature rise in the interior of the tube and the result is a benign environment for the thermocouple assembly. Molybdenum containing minor amounts of titanium and zirconium may be used, and the resulting alloy has the advantage that its use results in a stronger tube than a tube made of pure molybdenum because the alloy tends to inhibit recrystallization at the temperatures of interest.

Tubes made of stainless steel are quite satisfactory for use as the inner sheath or as a component of the inner sheath when the temperatures of lower melting materials, such as, for example, aluminum or brass are to be measured. Stainless steel has a cost advantage when compared to molybdenum and in some instances may be the metal of choice for the tube for that reason. Although, as noted above, metals other than molybdenum or molybdenum alloys may be used for the tube, in the following description the tube will be identified as a molybdenum tube. It is not intended that this should limit the invention, and persons skilled in the art will be able to substitute other suitable materials for molybdenum.

Although molybdenum has an extremely high melting temperature, it will readily oxidize at high temperatures. Molybdenum is also attacked by the chemically aggressive gases that are present in the vicinity of a metal melt. For these reasons a protective coating must be used to protect the molybdenum tube from the environment, when it is either inside or outside of the outer casing 2.

In accordance with the preferred embodiment of the invention, and as described in co-pending application Ser. No. 775,183, referred to above, the molybdenum tube is protected from the environment by a coating comprising a plurality of porous layers of a cermet, alumina-chromia-molybdenum, which are applied to the outer surface of the tube as by an arc plasma spray process.

It is common practice when applying ceramic coatings to substrates, such as those made of ceramic or metal, to match the coefficients of thermal expansion of the substrate and the coating material in order to minimize the thermal stresses arising from temperature changes which will weaken and ultimately destroy the coatings. To match the coefficients of thermal expansion of the coatings with the substrate materials, however, severely limits the choice of materials which can be used effectively for coatings. In the preferred form of the present invention, advantage is taken of mismatches of thermal expansion between the ceramic and the molybdenum to produce a controlled thermal mechanical stress which induces fine, well-controlled microcracking in the coating. This microcracking which is represented in FIG. 3 by numeral 15, together with the proper amount of porosity in the coating layers, results in a protective shield having superior thermoshock resistance as well as excellent chemical durability in hostile environments.

The porous layers of a cermet comprising alumina-chromia-molybdenum may be applied directly to the outer surface of metal tube 12 which has preferably been roughed, as by grit blasting, to improve adhesion of the protective coating. However, in the preferred method of carrying out the invention, the outer surface of metal tube 12 is first coated with a porous layer of molybdenum 16 formed from molybdenum powder as by arc plasma spraying the powder onto the surface of tube 12.

FIG. 3 illustrates the graded protective coating 14 which consists of a porous molybdenum bond coat 16 followed by porous cermet coats 18, 20, 22 which contain a mixture of alumina-chromia-molybdenum, with the molybdenum present in decreasing concentrations in proceeding from the inner to the outer surface. The outer coat 24 is substantially 100% alumina-chromia.

The alumina-chromia may suitable contain chromia in a concentration from about 10 to about 30 mole %, and the preferred alumina-chromia powder contains chromia in the amount of about 20 mole %. $Al_2O_3$—$Cr_2O_3$ containing about 20 mole % chromia has a thermal coefficient of expansion of about 8 parts per million per degree Centigrade.

The molybdenum has a thermal coefficient of expansion of approximately 5.4 parts per million per degree Centigrade which results in a 45% difference in the thermal coefficients of expansion of the ceramic and the molybdenum.

While the alumina and the chromia may be prepared by mechanically blending alumina and chromia powder, the preferred material is a powder which has been fully reacted by secondary firing.

In the preferred form of the inner sheath, the first porous layer which is adjacent the molybdenum substrate is formed from molybdenum powder. Subsequent layers have a decreasing concentration of molybdenum and an increasing concentration of ceramic, and the outer layer is 100% ceramic. While the extent of the changes made in the compositions in proceeding from one layer to another is not critical, in the preferred method of carrying out the invention, the change in the concentration of molybdenum is a straight line volume percent relationship in proceeding from the inner to the outer layers.

While the number of layers of the cermet may range from 2 to 10 or more, and preferably from 3 to 9, little advantage is gained by going beyond about 5 layers and the cost of making the inner sheath increases with the number of layers used. In the preferred method of making the inner sheath, the graded protective coating 14 consists of five layers starting with 100% molybdenum for the first layer, 75%–25% ceramic for the second layer, 50% molybdenum—50% ceramic for the third layer, 25% molybdenum—75% ceramic for the fourth layer, and 100% ceramic for the fifth layer.

The total thickness of the various layers may suitably range from about 0.020 inch to about 0.040 inch. In the preferred method of carrying out the invention, the porous molybdenum layer adjacent the molybdenum tube and each successive porous cermet layer has a thickness from about 0.002 inch to about 0.004 inch, and the outer ceramic coat has a thickness from about 0.015 inch to about 0.025 inch. Very close control of the thicknesses of the various layers is not essential in order to produce an inner sheath which is resistant to thermal shock. However, in the preferred method of carrying out the invention, each of the layers of molybdenum and cermet has approximately the same thickness, for example about 0.003 inch.

It is essential that the cermet layers have a porosity of from about 4 to about 33%. The preferred range of porosity is from about 15–30% and the optimum is from about 20–25%. While the function of the pores is not fully understood, it is believed that the pores accommodate the expansion of the material in the layers when subjected to a high temperature environment. The values for porosity given herein are as determined by optical microscopy using standard stereological techniques.

The preferred method of achieving the desired porosity is by applying the molybdenum, cermet and ceramic layers by a plasma arc process. Such a process has been found to be particularly useful because it permits control of the critical parameters of surface structure and porosity of the layers. The degree of porosity of a metal, cermet or ceramic layer deposited in a plasma spray coating process primarily is determined by the magnitude of the process parameters of (1) power input to the arc, (2) powder feed rate, (3) the distance from and the angle to the substrate surface of the spray nozzle, and (4) the rate of traverse of the spray nozzle over the substrate surface.

The power may suitably range from about 15 to about 45 KW and the preferred level of power input is from about 30 to about 40 KW. A decrease in the power input results in a increase in the porosity of the coated layer.

The powder feed rate may be in the range from about 6 pounds to about 10 pounds of powder per hour. A decrease in the powder feed rate decreases the porosity of the coated layer.

The spray nozzle is preferably held a distance of from about 2 inches to about 6 inches away from the substrate surface. The porosity of the coated layer increases with an increase in the distance between the spray nozzle and the substrate.

The angle that the sprayed particles make with respect to a line perpendicular to the axis of the body being sprayed may be as great as 30%; however, the preferred angle is about 0° to about 10°. As the angle of impact is increased, the porosity increases. The traverse rate of the spray nozzle along the substrate surface may suitably range from about 4 inches to about 12 inches per second. The porosity increases as the traverse rate increases.

In the preferred method, the substrate is rotated as it is sprayed. A typical rate of rotation is about 600 revolutions per minute for a ½ inch tubular substrate.

In carrying out the coating process, the substrate should be heated, preferably to a temperature in the range of about 200° F. to about 500° F. While a change in the substrate temperature may change the degree of porosity to some extent, the effect appears to be minor.

The type and force of plasma gases also have little effect on controlling the degree of porosity. Useful gases are a mixture of nitrogen and hydrogen in the volume ratio of nitrogen to hydrogen of from about 4:1 to about 8:1. Typically useful flow rates are 2.5 standard cubic feet to 5 standard cubic feet per minute for nitrogen and 0.3 standard cubic feet to 0.6 standard cubic feet per minute for hydrogen.

OUTER CASING

As shown in FIG. 1, outer casing 2 is provided to protect the inner assembly from the molten metal and the slag layer. Outer casing 2 is made from a mixture of graphite and a metal oxide, and typically useful mixture are alumina-graphite-silica, zirconia-graphite, magnesieum graphite or some combination thereof. The concentration of graphite is selected to provide good heat conductivity for the casing and may be in the range from about 10% to about 35% by weight. The concentration of graphite is preferably in the range of about 25% to about 35%.

Outer casing 2 is closed at one end to provide a cavity 3 for inner sheath 11. Cavity 3, which has lower end 7 and upper end at 9, is sized to fit snugly around the tip of inner sheath 11 and provides a low resistance heat path to inner sheath 11 and thermocouple junction 54.

The dimensions of the walls which form cavity 3 are selected to provide good thermal response with long life. If the walls are too thin the lifetime is short and if the walls are too thick, the thermal response is poor. An end wall thickness less than ¼" is too fragile and an end wall thickness of 1" or more results in a poor thermal response. The preferred thickness of the end wall is from ¼" to ½" and the optimum thickness is about ½". The side wall should be no less than ½" thick and preferably is from about ½ to about 1 inch thick.

The cavity 3 must extend far enough from the end of the casing 2 to encompass thermocouple 54, and the greater the depth of the cavity the better the thermal response. A depth of about 12 inches from lower end 7 to upper end 9 may be the practical upper limit, considering manufacturing costs of making long slender cavities, a practical range is from about ½ inch deep to about 12 inches deep. The preferred depth is about 2 inches.

While the inner cavity 3 is sized to fit snugly around the tip of sheath 11, in a preferred embodiment of the invention, the outer portion 5 of the cavity in casing 2 has a diameter greater than that of the sheath and more preferably has a diameter of from about ½ inch to about 1 inch greater than the diameter of the sheath.

The inner sheath 11 is held within and spaced from outer casing 2 by a castable alumina 6. A cavity with the proper dimensions for the inner sheath may be formed by inserting into the cavity of the outer casing 2 a casting mandrel which is the same size and shape as the inner sheath. A castable refractory such as alumina is then packed in the annular cavity until the void is completely filled. The mandrel is then removed and the thermocouple assembly is installed into the cavity left by removal of the mandrel. It is crucial to adequate thermal response that the tip of the inner sheath be in direct thermal contact with the outer casing; consequently, the castable refractory 6 should be kept from the cavity 3 at the bottom of the outer casing.

The graphite serves to increase the heat conductivity of the casing and its presence in the mixture results in a good thermal response. The concentration of graphite may depend, to some extent, on the environment to which the casing is exposed. For example, zirconia is an excellent metal oxide for use in contact with slag, and in order to take full advantage of the properties of zirconia, the concentration of graphite may be held relatively low, i.e., from about 10% to about 20%. Typically, the concentration of the graphite in the metal oxide-graphite mixture will be in the range from about 20% to about 35%, and preferably from about 25% to about 30%.

The metal oxides alumina, zirconia or magnesia or mixtures thereof may constitute substantially all the remainder of the mixture, or other high temperature materials such as, for example, SiC and $SiO_2$ may be present in amounts up to about 15 to 20%.

Refractory structures which have compositions as set forth above are available commercially and some of these structures can be modified for use with the present invention. The following Table sets forth the chemical composition of some of these refractories:

| Component | Composition % | | | | | | |
|---|---|---|---|---|---|---|---|
| | I | II | III | IV | V | VI | VII |
| $Al_2O_3$ | 42–46 | 43–47 | 38–42 | 49–53 | 52 | — | — |
| $ZrO_2$ | — | 3–5 | 6–8 | 4–6 | — | 65–69 | 75–79 |
| Free C | 27–29 | 28–30 | 24–26 | 27–29 | 31 | 16–18 | 11–13 |
| $SiO_2$ | 19–23 | 13–17 | 17–19 | 3–5 | 13 | — | — |
| SiC | 4–6 | 4–6 | 8–10 | 8–10 | — | 9–11 | 5–7 |
| Other | — | — | — | — | 5 | — | — |

As noted above, an uncoated molybdenum tube may be used as an inner sheath. An uncoated molybdenum tube has the advantage over coated tubes of a lower cost, and its attack in the environment of the graphite-containing outer casing such as, for example, near the tip which is inserted into cavity 3, is limited. Contact of a molybdenum tube with the refractory oxide-graphite composition of the outer casing results in a well-controlled carburization of the surface of the molybdenum tube. The formation of a carbide-oxide surface on the molybdenum tube slows the further degradation of the tube, yielding a "self-healing" surface layer that would permit a long surface life, for example over 100 hours. The preferred method, of course, is the use of a protective ceramic coating since even if the outer casing fails, the sensing element itself is protected from the molten metal by the ceramic coating.

Having thus described the invention, the following Example is given to illustrate it in more detail.

EXAMPLE

A molybdenum tube 0.11 inch in well thickness, ½ inch in diameter and 12 inches long is cleaned, degreased and its outer surface is grit-blasted with powdered alumina. The resulting tube, which is ready for coating, is preheated to a temperature of about 300° F. and, while rotating at 600 RPM, is plasma arc sprayed with molybdenum powder to form a porous layer 0.003 inch thick. The spraying is accomplished by feeding molybdenum powder at a rate of 8 pounds per hour into an arc formed form a mixture of 85% nitrogen and 15% hydrogen and having a power input of 35 KW. The spray nozzle is held 4 inches from the outer surface of the rotating tube and moved parallel to the axis of the tube at a rate of 8 inches per second. The nozzle is held at such an angle that the molten particles of molybdenum strike the outer surface of the tube at an angle of 10° from a line perpendicular to its axis.

The resulting porous, molybdenum-coated tube is reheated to a temperature of 300° F. and is sprayed to form a porous cermet layer on top of the porous molybdenum layer using as a feed powder consisting of 75% by volume of molybdenum and 25% by volume of $Al_2O_3$—$Cr_2O_3$. The mol ratio of $Al_2O_3$ to $Cr_2O_3$ is 4:1.

A layer 0.003 inch thick consisting of 50 volume percent molybdenum, 50 weight percent $Al_2O_3$—$Cr_2O_3$, followed by a layer 0.003 inch thick of 25% molybdenum and 75% $Al_2O_3$—$Cr_2O_3$ and then a 0.020 inch thick layer of substantially pure $Al_2O_3$—$Cr_2O_3$ are plasma arc-sprayed onto the rotating tube under conditions substantially the same as those used to form the preceding porous layers. Each porous layer has a porosity in the range of 20 to 25%. The tube is reheated to 300° F. between each coating step.

An outer casing for the resulting inner sheath is formed from a powder mixture consisting of alumina-graphite-silica in the amounts of 52% alumina, 31% graphite and 13% silica. The mixture, which contains a binding agent, is isostatically pressed around a mandrel to form a device having the shape of element 2 as shown in FIG. 1. Subsequent to pressing, the resulting green monolith is fired to fuse the material together, and after the initial firing the casing is coated on the outside with a mixture of frit and silica and then fired again to form a glassy covering. This covering serves to inhibit oxidation of the graphite. A casting mandrel which is slightly larger than the inner sheath is inserted into the cavity and a castable alumina is then packed in the resulting annular cavity until the void is completely filled. Care is taken so that none of the castable alumina enters the cavity at the bottom of the outer casing. The mandrel which had been coated with a release agent, is then removed. The casing is air-cured for 24 hours and then baked at 675° F. for an additional 24 hours. The thermocouple assembly is then installed into the cavity left by removal of the mandrel.

What is claimed is:

1. Temperature-sensing apparatus comprising, in combination,
   (a) a sheath for enclosing a temperature-sensing element, said sheath comprising a closed-end metal tube;
   (b) a temperature-sensing element disposed within said sheath near the closed end thereof; and,
   (c) a casing having an outer surface for contacting high temperature molten media, and an inner cavity for holding said sheath, said inner cavity having an inner surface, an outer opening, and an inner closed end, said casing comprising a refractory metal oxide and graphite, and said graphite being present in a concentration from about 10 percent to about 35 percent. to provide good heat conductivity between said outer surface of said casing and inner surface of said cavity.

2. Temperature-sensing apparatus in accordance with claim 1 wherein the closed end of said sheath is in intimate contact with a portion of the inner surface of said cavity, and wherein the remainder of said refractory metal tube is spaced from the inner surface of said cavity, and space between said inner sheath and said inner surface of said cavity is substantially filled with a refractory metal oxide.

3. Temperature-sensing apparatus in accordance with claim 2 wherein said refractory metal oxide is alumina.

4. Temperature-sensing apparatus in accordance with claim 2 wherein said cavity and said sheath have circular cross-sections, said cavity has a smaller cross-sectional area at the inner closed end than at the outer opening thereof, and the cross-sectional area at said inner closed end is about equal to the cross-sectional area near the closed end of said sheath.

5. Temperature-sensing apparatus in accordance with claim 4 wherein the axial length of that portion of said cavity which has the smaller cross-sectional area is from about ½ inch to about 12 inches.

6. Temperature sensing apparatus in accordance with claim 4 wherein the axial length of that portion of said cavity which has the smaller cross-section is about ½ inch to about 2 inches.

7. Temperature-sensing apparatus in accordance with claim 3 wherein the diameter of said cavity at the outer opening thereof is about ⅛ inch to about 1 inch greater than the diameter of said sheath.

8. Temperature-sensing apparatus in accordance with claim 1 wherein said metal tube comprises metal selected from the group consisting of carbon steels and nickel-chromium alloys.

9. Temperature-sensing apparatus in accordance with claim 1 wherein said outer casing contains graphite in a concentration of about 25 percent to about 30 percent.

10. Temperature-sensing apparatus in accordance with any one of claims 1–9 wherein said sheath comprises a closed end refractory metal tube covered with a plurality of porous cermet layers, said cermet layers consisting essentially of alumina oxide-chromium oxide-molybdenum having a porosity of from about 4 percent to about 33 percent, and a coat of substantially pure alumina oxide-chromium oxide covering the outermost cermet layer, said ceramic layer having a porosity from about 4 percent to about 33 percent.

11. Temperature-sensing apparatus in accordance with claim 1 wherein the metal tube comprises molybdenum.

12. An outer protective casing for a thermocouple assembly, said casing having side wall(s) and an end wall, said walls having outer surfaces for contacting high temperature molten media and inner surfaces which define a cavity for holding said thermocouple assembly, said cavity having an open end for inserting and removing said thermocouple assembly, said casing comprising a refractory metal oxide and graphite, said graphite being present in a concentration from about 10 percent to about 35 percent to provide good heat conductivity between said outer and inner surfaces of said walls.

13. The outer protective casing according to claim 12 wherein said refractory metal oxide is alumina.

14. The outer protective casing according to claim 12 wherein the closed end comprises a wall having a thickness from about ¼ inch to about ½ inch.

15. The outer protective casing according to claim 12 wherein at least a portion of said side walls which are near said end wall have a thickness of from about ½ inch to about 1 inch.

16. The outer protective casing according to claim 12 wherein said graphite is present in a concentration from about 25 percThe outer protective casing according to claim 12 wherein said graphite is present in a concentration from about 25 percent to about 30 percent.

17. The outer protective casing according to claim 12 wherein the closed end comprises a wall having a thickness greater than ¼ inch and less than 1 inch.

18. The outer protective casing according to claim 12 wherein said cavity has a smaller cross-sectional area in a zone near the end wall than at the open end.

19. The outer protective casing according to claim 17 wherein the zone having the smaller cross-sectional area extends a distance of from about ½ inch to about 12 inches from the end wall.

20. The outer protective casing according to claim 18 wherein the zone having the smaller cross-section area extends a distance of about 2 inches from the end wall.

* * * * *

UNITED STATES PATENT AND TRADEMARK OFFICE
CERTIFICATE OF CORRECTION

PATENT NO. : 4,721,533
DATED : January 26, 1988
INVENTOR(S) : Phillippi et al

It is certified that error appears in the above-identified patent and that said Letters Patent is hereby corrected as shown below:

In claim 16, delete entire claim as printed and insert therefor:

-- 16. The outer protective casing according to claim 12 wherein said graphite is present in a concentration from about 25 percent to about 30 percent. --

Signed and Sealed this

Twenty-eighth Day of June, 1988

Attest:

DONALD J. QUIGG

Attesting Officer
Commissioner of Patents and Trademarks